(No Model.)

R. A. MEDARIS.
TIRE TIGHTENER.

No. 580,500. Patented Apr. 13, 1897.

Witnesses:
Wm. F. Doyle.
J. A. Willson.

Inventor.
Rice A. Medaris.
By H. B. Willson,
Attorney.

THE NORRIS PETERS CO., PHOTO-LITHO., WASHINGTON, D. C.

UNITED STATES PATENT OFFICE.

RICE A. MEDARIS, OF FARMERSVILLE, ILLINOIS.

TIRE-TIGHTENER.

SPECIFICATION forming part of Letters Patent No. 580,500, dated April 13, 1897.

Application filed August 5, 1896. Serial No. 601,731. (No model.)

*To all whom it may concern:*

Be it known that I, RICE A. MEDARIS, a citizen of the United States, residing at Farmersville, in the county of Montgomery and State of Illinois, have invented certain new and useful Improvements in Tire-Tighteners; and I do declare the following to be a full, clear, and exact description of the invention, such as will enable others skilled in the art to which it appertains to make and use the same.

My invention has relation to tire-tighteners, and the object is to produce a cheap, convenient, and simple device for vehicle-wheels whereby the tires may be tightened when the felly shrinks; and to this end the novelty consists in the construction, combination, and arrangement of parts of the same, as will be hereinafter more fully described, and particularly pointed out in the claims.

In the accompanying drawings the same letters of reference indicate the same parts of the invention.

Figure 1:
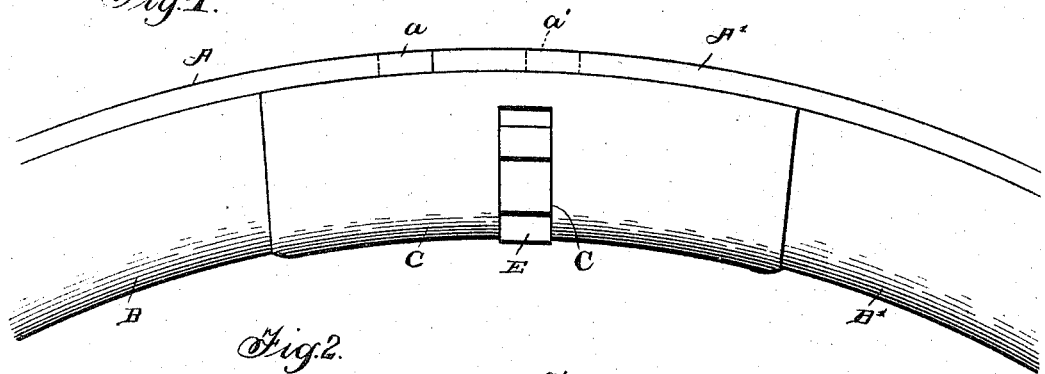
Figure 2:
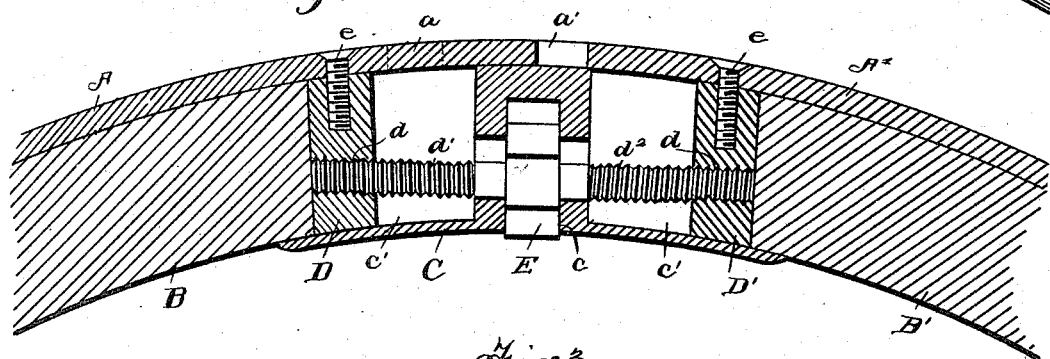
Figure 3:
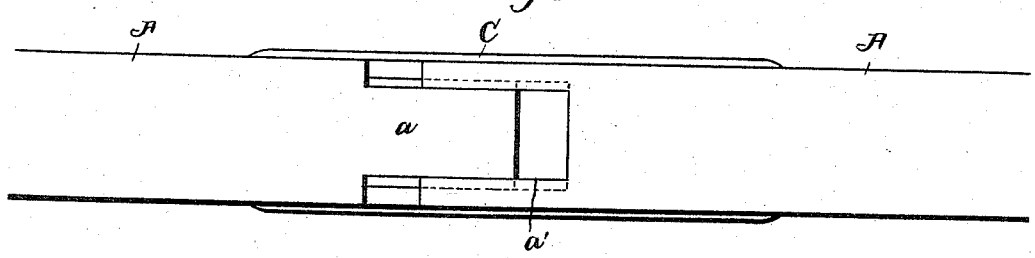
Figure 4:
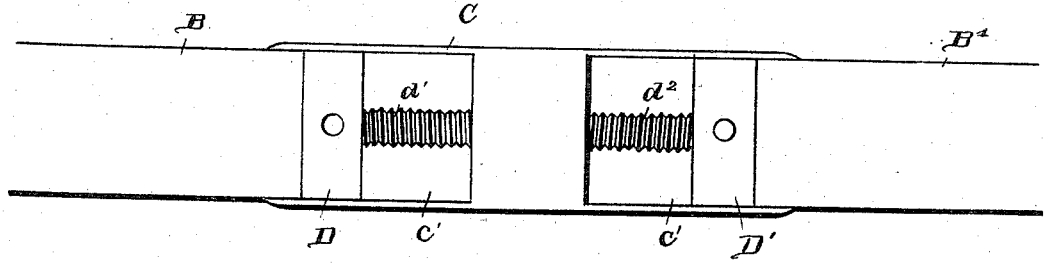

Figure 1 is a side elevation of a section of a wheel, showing my improved tire-tightener applied to the tire and felly. Fig. 2 is a longitudinal section of the same. Fig. 3 is a top plan view of the same, and Fig. 4 is a similar view with the tire removed.

A A' represent the two contiguous ends of the tire, and B B the similar ends of the felly.

C is a metal shoe formed with a transverse recess $c$ and two radial recesses $c'$ $c'$, in which are respectively located the sliding blocks D D'. These sliding blocks D D' are formed, respectively, with a right and a left hand female thread $d$, which receive the correspondingly-threaded opposite ends $d'$ $d^2$ of a bolt, the central head E of which is located in the recess $c$ in the shoe C, which, when rotated, draws the blocks D D together in their recesses $c'$ $c'$.

The end A of the tire is formed with a dovetail male tongue $a$, and the opposite end A' is formed with a corresponding dovetail recess $a'$, into which the tongue $a$ enters.

The end A is detachably secured to the sliding block D by the ordinary countersunk head-screws $e$, and the opposite end A' is similarly secured to the block D'.

In operation if the felly becomes loose at any time the head E of the right and left hand threaded bolt can be turned by a suitable wrench, which draws the blocks D D' together in their recesses $c'$ $c'$. This forces the tongue $a$ into the recess $a'$, and consequently tightens the tire on the felly, as will be fully understood in connection with the annexed drawings. The ends $d'$ $d^2$ abutting against the ends of the felly keeps them in the same position in which the screw is drawing the ends of the tire together.

Having thus fully described my invention, what I claim as new, and desire to secure by Letters Patent of the United States, is—

1. The tire A A' formed with a dovetail tongue $a$ and a similar-shaped recess $a'$, in combination with the shoe C formed with a transverse recess $c$ and longitudinal recesses $c'$ $c'$ in which are located the threaded sliding blocks D D' and a bolt provided with a central head E and right and left hand screw-threaded portions $d'$ $d^2$, adapted to engage the sliding blocks D D', substantially as and for the purpose set forth.

2. A tire-tightener comprising a tire, the contiguous ends of which are formed with a dovetail tongue $a$ and corresponding recess $a'$, said contiguous ends being secured to blocks D D' sliding in the recesses $c'$ $c'$ in the shoe C, in combination with a bolt, the head E of which is located in the recess $c$ in said shoe, and its oppositely-screw-threaded ends $d'$ $d^2$ engaging the correspondingly-screw-threaded sliding blocks D D', substantially as and for the purpose set forth.

In testimony whereof I hereunto affix my signature in presence of two witnesses.

RICE A. MEDARIS.

Witnesses:
E. M. COLE,
C. H. MATHEWS.